Dec. 25, 1956  W. M. SCOTT, JR  2,775,643
HALF CIRCULAR BUS BRACKET
Filed Aug. 16, 1950  4 Sheets-Sheet 1
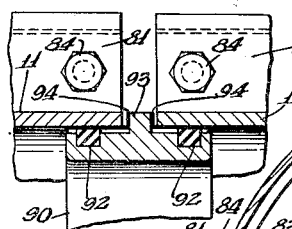
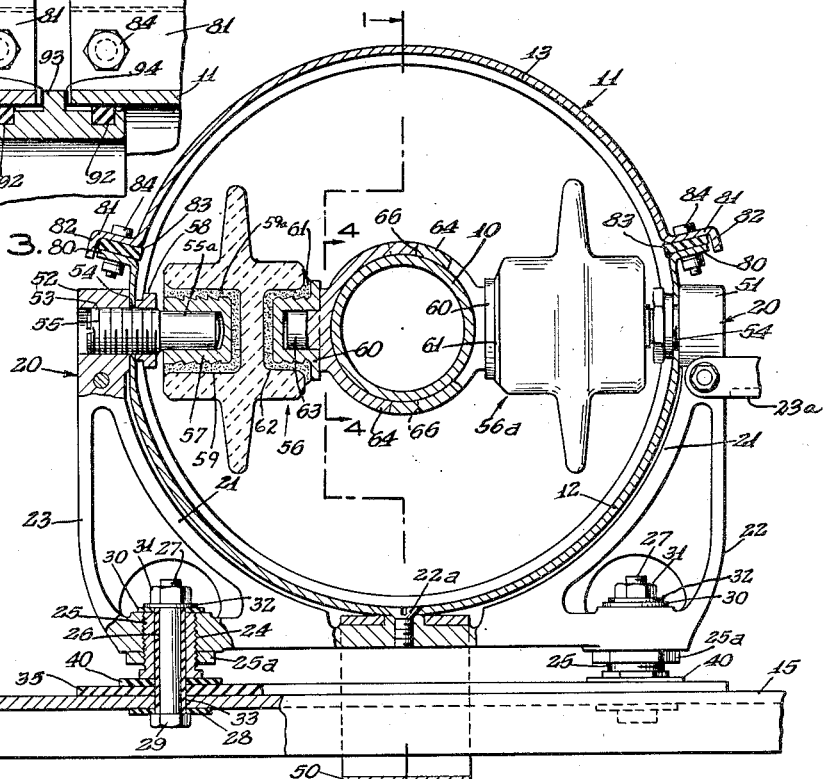
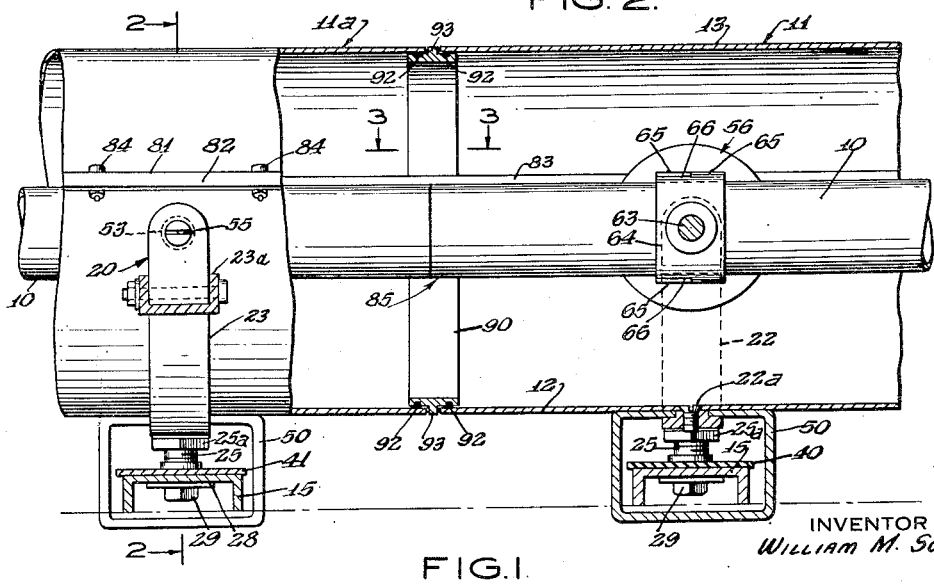
INVENTOR
WILLIAM M. SCOTT, JR
BY
Ostrolenk & Faber
ATTORNEYS Dec. 25, 1956 W. M. SCOTT, JR 2,775,643
HALF CIRCULAR BUS BRACKET
Filed Aug. 16, 1950 4 Sheets-Sheet 2
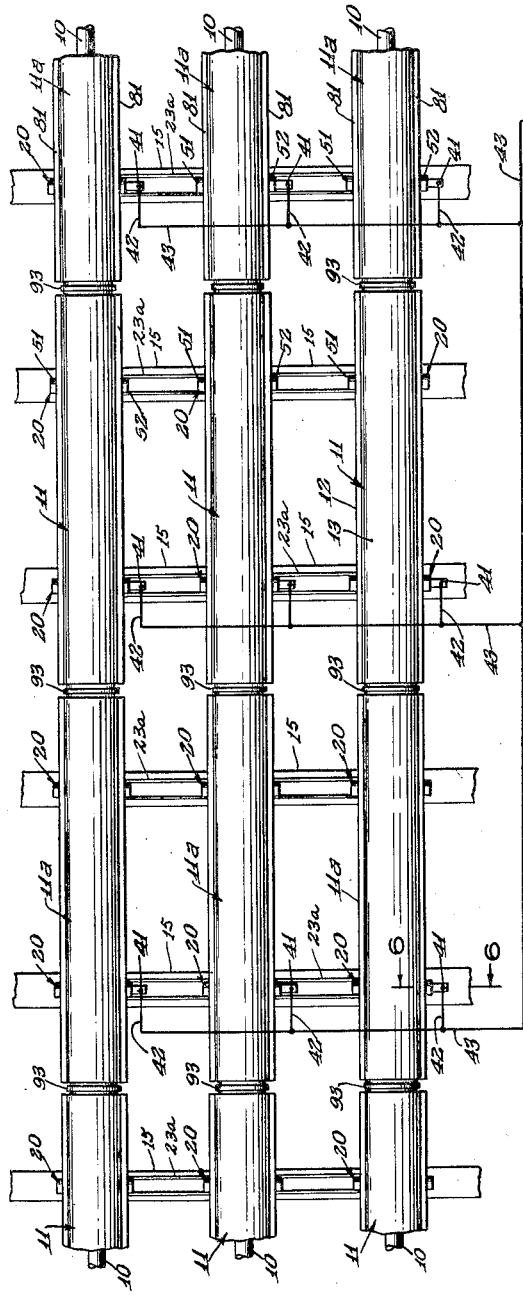
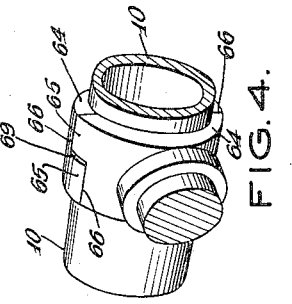
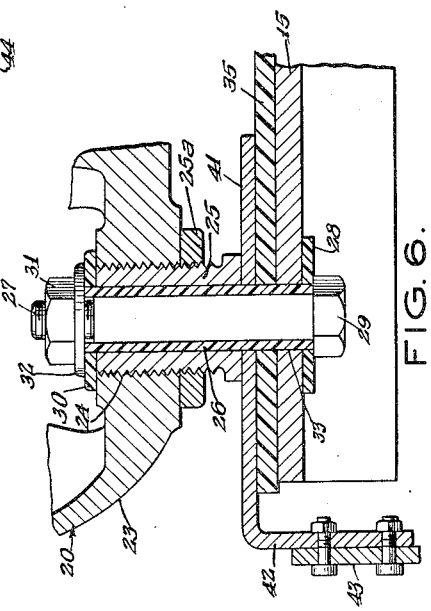
INVENTOR
William M. Scott, Jr.
BY
Ostrolenk & Faber
ATTORNEYS Dec. 25, 1956 W. M. SCOTT, JR 2,775,643
HALF CIRCULAR BUS BRACKET
Filed Aug. 16, 1950 4 Sheets-Sheet 3
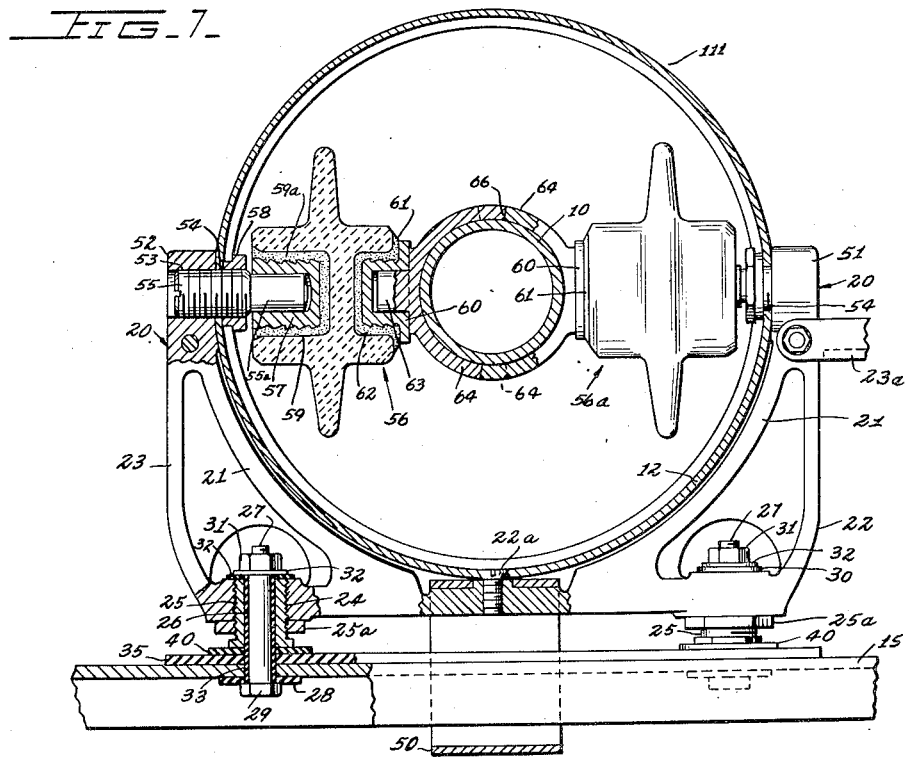
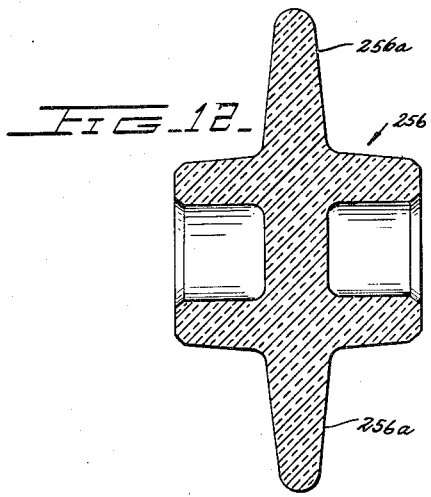
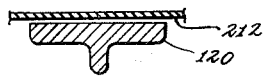
INVENTOR.
WILLIAM M. SCOTT, JR.
BY Ostrolenk & Faber
ATTORNEYS Dec. 25, 1956  W. M. SCOTT, JR  2,775,643
HALF CIRCULAR BUS BRACKET
Filed Aug. 16, 1950  4 Sheets-Sheet 4

INVENTOR.
WILLIAM M. SCOTT, JR.
BY Ostrolenk & Faber
ATTORNEYS

United States Patent Office 2,775,643
Patented Dec. 25, 1956

2,775,643

HALF CIRCULAR BUS BRACKET

William M. Scott, Jr., Bryn Mawr, Pa., assignor to I-T-E Circuit Breaker Company, Philadelphia, Pa., a corporation of Pennsylvania Application August 16, 1950, Serial No. 179,687

2 Claims. (Cl. 174—99)

My present invention relates to electrical bus structures and more particularaly to an isolated phase bus housing wherein a simplified and relatively inexpensive support structure is provided and wherein also assembled bus and housing sections may be shipped for connection and installation as prefabricated units.

Heretofore in the construction and operation of isolated phase enclosed buses of a polyphase system the buses of each phase have primarily been held in position with their respective housings by three or more insulators angularly disposed with respect to each other about the bus and held in position by annular bus rings which also secure and support the bus runs or housings.

These annular rings are axially spaced from each other and as stated above each carry three or more insulators through which the stresses set up in the bus when current flows therein are transmitted to the annular rings and thence to the mechanical or structural members to which the rings are secured.

While three or more insulators are desirable for better protection, particularly in vertical runs, there are many situations where I have discovered two insulators mounted substantially 180° apart, i. e., on diametrically opposite sides of the bus, will provide all of the usually required bus support.

Thus, when buses of a three phase operation are arranged in parallel with the axes of all the buses in one plane, the opposing forces set up by the buses when currents flow are in a direction transverse to the axis of the buses and generally in the plane in which the axes of the three buses lie.

Insulators mounted with their longitudinal axis in this plane of the three bus axes with their longitudinal axis transverse of the longitudinal axis of the buses, i. e., the insulator axis extending from the axis of one bus to the axis of the next bus and at right angles to the bus axis, will accordingly be placed under compression as a result of the forces between the buses.

In addition to these forces, which are as the square of the current, there is also the much lesser force of the mass of the bus structure in a vertical direction or at right angles to the longitudinal axis of the insulator and set up a cantilever stress on the insulators. While this is undesirable, it is of minor proportion.

Inasmuch as I can thus support the bus with two insulators diametrically opposed on said bus with respect to each other, I can use a ring for supporting the two insulators which extends only through approximately 180°.

By employing a ring extending only part way around, i. e., not being continuous, the problem of eddy current flow magnetic losses caused therein by the changing flux of the system is eliminated. Thus, it is no longer necessary to use expensive non-magnetic rings such as of bronze as heretofore used. Accordingly, I can and prefer to use cast iron semicircular rings.

Accordingly an object of my invention is to provide a novel bus system in which only two insulators are employed for each ring section.

A further object of my invention is to provide a novel system in which two insulators are mounted on and supported by a semicircular ring.

Still a further object of my invention is to provide two insulators for each supporting ring on opposite sides of the bus and arranged to carry the forces set up by current flow in the buses by compression.

A further object of my invention is directed to the utilization of U-shaped supports extending over a limited arc rather than over a full circle in order to provide an appropriate cradle or support for the bus housing.

Still a further object of my invention is the provision of simplified inexpensive support structures for an isolated phase bus housing.

Another object of my invention is the utilization of half ring supports for the bus housing.

A further and corollary object of my invention is the provision of a novel system utilizing a limited number of insulators at each support station of the bus, preferably two insulators being used in each support station and providing, however, all of the support required both for physically carrying the bus bar as well as for reinforcing it against deflection owing to magnetic stresses which may be set up under certain conditions.

In accordance with one form of my invention, I mount my supporting ring for the insulators around the outside of the bus housing. In accordance with this arrangement, the buses, housing, rings and insulators may be made in sections ready for assembly as a circuit at the customer's location.

The foregoing and many other objects of my invention will become apparent in the following description and drawings in which:

Figure 1 is a side view partly in longitudinal cross-section showing my novel bus housing and bus support structure.

Figure 2 is a cross-sectional view taken on line 2—2 of Figure 1 looking in the direction of the arrows and showing one of the support sections for my novel bus housing.

Figure 3 is a cross-sectional view taken on line 3—3 of Figure 1 looking in the direction of the arrows.

Figure 4 is a side view in perspectvie and partly in cross-section taken on line 4—4 of Figure 2 looking in the direction of the arrows and showing the manner in which the insulators carry the clamps which in turn support the bus bar itself.

Figure 5 is a top plan view showing a complete bus run for a three phase isolated phase bus structure.

Figure 6 is a fragmentary enlarged sectional view taken on line 6—6 of the lower left-hand corner of Figure 5.

Figure 7 is a view corresponding to that of Figure 2 showing, however, a full cylindrical bus enclosure rather than the longitudinally segmented bus enclosure of Figure 2.

Figure 10 is a cross sectional view of line 11—11 of Figure 8.

Figure 11 is a cross sectional view of line 12—12 of Figure 8.

Figure 12 is a cross-sectional view through a bus carrying insulator usable in the modification of Figures 8 and 9.

Figure 8:
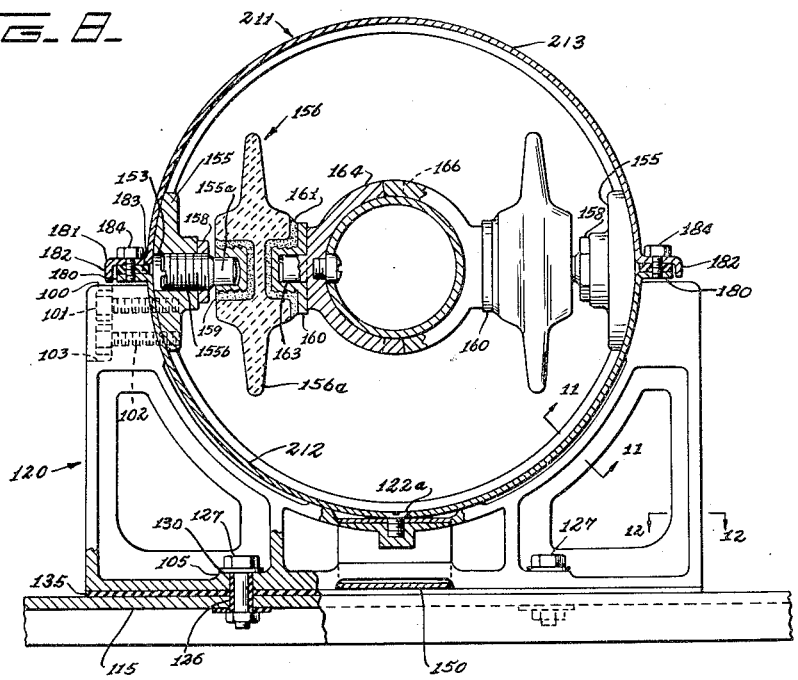
Figure 8 is a cross sectional view showing a modified form of the bus support wherein the bus support member may be limited in height.

Referring to Figures 1 to 6, each of the buses 10 in the isolated phase bus structure is supported within the housing 11. The housing 11 in the form here shown comprises a lower housing section 12 and an upper housing section 13. These housing sections are here referred to as lower and upper in order to distinguish them from each other and usually the section 13 will be the upper section of the housing 11 of the bus run.

However, where the bus run is vertical, the utilization of the term lower and upper will refer primarily, respectively, to the supported section 12 and the removable cover section 13. Also, in certain instances it may be desirable particularly in overhead bus runs to invert the structure so that the "upper" section 13 comprising the cover will actually be on the underside.

The bus run is supported on appropriate structural members which in the figures (2 and 5) are shown as the upper sections of beams 15, 15, the beams being in turn supported at an appropriate position on desired structural members.

Each prefabricated section of the bus comprises as shown particularly in Figure 2 two half ring support members 20, 20 carrying a housing section 11 which extends beyond each of the support members 20, 20 with appropriate means being provided to interconnect each bus assembly at longitudinally adjacent bus assemblies. That is, the ends of buses 10 at each assembly will be provided with appropriate pigtails for connection to the longitudinally adjacent bus and the ends of the housings 11 will, as hereinafter described, be provided with appropriate connecting members so that a continuous dust-excluding housing will be formed.

Each of the half rings 20 as shown particularly in Figures 1 and 2 comprises an arcuately shaped cradle section 21 adapted to receive the lower housing section 12. The arcuately shaped cradle section 21 also is provided with a pair of legs 22, 23. Each of the legs 22, 23 has a tapped opening 24 in which is threaded the hollow metal sleeve 25.

Insulating bushing 26 is then inserted in the opening of the hollow metal sleeve 25. Sleeve 25 is secured by clamping nut 25a. A bolt 27 is then passed through the insulating bushing 26 with an insulating washer 28 being provided beneath the head 29 of the bolt 27 and an insulating washer 30 being provided beneath the nut 31 and washer 32 on the bolt 27.

The bolt 27 passes through bushing 26 which goes through an opening 33 in the beam 15 and then through the metal insert 25—the nut 31 clamping against the insulating washer 30 on the upper side of the ledge support 23 and securing the leg 23 in place.

This type of securement is used for both legs 22 and 23 of the support member 20 in order to position the support member 20 on the structural support elements 15. An insulating plate 35 is provided across the support elements so that the metal insert 25 on each side is at all times fully insulated from ground.

The metal sleeve 25 provides for appropriate adjustment of the height of legs 22 and 23 so that the support member 20 will be level and will be properly adjusted on its support.

As shown in Figure 5, one support member 20 for each prefabricated bus assembly is to be connected to ground while the other support element is to be insulated. This is done so that the bus housing may be grounded but also so that there will be no short circuit path through the bus housing from one of its support members to the other support member.

Each of the prefabricated bus sections is insulated from the adjacent bus section in the manner hereinafter described.

In order to achieve the grounding of the bus support member 20 while at the same time making it possible to insulate the support members which are to be insulated, a common mounting means is provided illustrated in operation in Figures 2 and 6.

In Figure 2 the leg 23 of the support member 20 is shown insulated from ground by the insulating plate 40 inserted between the metal insert 25 and the base insulating strip 35.

It will thus be seen that the bushing 26, the insulating washers 30 and 28, the insulating plate 35 and the insulating strip 40 serve to isolate leg 23 from the base structure 15.

The same elements are utilized in the leg 22.

In Figure 6 the structure is similar except that the ground bus lead 41 has been substituted for the insulating washer or strip 40 of Figure 2. The ground bus lead 41 is metallic and is connected by leads 42 and 43 to ground 44.

Thus, in the embodiment shown in Figure 5, alternate legs of the members 20, 20 utilize the metal ground connector 41 and alternate members 20 utilize the insulating strip 40.

As a result, the current to ground in any one housing section is from the housing directly to the legs 22 and 23 of the support member 20, through the metal insert 25, and then from the base of the metal insert to the ground connector 41. It cannot find a direct or circulating path to another section or a return path to the same housing section.

By utilizing the ground connector 41 at desired locations and the insulating washer or strip 40 at other desired locations, the current to ground path can be controlled as desired.

The housing section 12 is secured to the base of the cradle 21 of the two housing support members 20 with which it cooperates by a screw 22a passing through the housing section 12 and into an appropriate tapped opening in the cradle section 21 of the bus support 20.

An appropriate shading band 50 may be provided at the center of the base cradle 21 surrounding either the beams 15 or the cradle 21 or both at that point for providing a magnetic shield for the structural members at the point of support to thereby reduce the magnetic and current losses in the structural members.

Non-magnetic braces 23a (Figures 1, 2 and 5) may be provided to brace the bus phases additionally against collapse away from or toward each other. The ends 51, 52 of the support member are provided with tapped openings 53 on each side into which may be threaded the threaded ends 55 of insulators 56. The ends 55 (Fig. 3) of inserts in insulators 56 pass through openings 54 in the housing section 12 on each side and the housing section 12 on each side is further clamped to the support by the lock nuts 58 which are threaded back on the threaded ends 55 to perform the clamping operation shown at the left center of Fig. 2.

The reduced diameter 55a of the threaded inserts 55 of the insulators 56 are longitudinally slidable in cups 57 which are held by cement 59a in the recesses 59 at the outer ends of each insulator 56.

The longitudinal adjustment of the threaded insert 55 in the tapped opening 53 of the support determines the longitudinal position of insulator 56. The opposite end of each insulator is provided with a cup 60 secured by cement 61 in recess 62 of the insulator 56. The cup 60 receives the extension 63 of the half clamping ring 64.

The insulator 56a is similarly constructed. The half clamping rings 64 on each side are arranged so that they may meet to support the bus 10. Each end of the half clamping rings 64 as shown in Figure 4 is provided with an extension 65 and recess 66 matching with a corresponding extension and recess in the opposite clamping ring so that the meeting edges at 69 will serve to retain the clamping rings together and prevent movement in a direction to separate them.

The half clamping rings 64 are so dimensioned that when they meet they will firmly support the bus 10 while permitting longitudinal sliding motion thereof.

In any bus length it is desirable that provision be made for expansion and contraction owing to thermal conditions, while at the same time the bus be held securely. Thus, provision may be made for holding the bus stationary at one of the clamps.

After the bus 10 has been positioned by the insulators and all of the operations are completed for connecting the bus lengths together, grounding the appropriate legs of the supports and all other connecting operations required have been performed, the housing cover 13 may be secured in position.

For this purpose, the lower housing section 12 is provided with a longitudinal flange 80 on each side and the upper housing section 13 is provided with a matching longitudinal flange 81 on each side, having also the downwardly turned extension 82.

A dust-excluding gasket 83 is provided between meeting flanges 80 and 81 and securing bolts 84 are passed through registering openings in the flanges 80 and 81 and the gasket 83; the downwardly extending flanges 82 serve further to protect the gasket 83 and increase the dust-proof qualities of the housing.

Each of the pre-fabricated sections having two supports 20 may be shipped as a complete assembled unit with a bus in place thereon to be connected to the bus of the adjacent unit, or, each of the sections may be shipped as a completely assembled unit, with, however, the bus omitted from the assembly so that a longer bus traversing two or three or more housing units may be placed in position at the point of assembly.

This condition is shown in Figure 1 where the bus passes from housing unit assembly 11 to the housing unit assembly 11a. Where each sub-assembly is shipped as a complete unit with the bus in place, then the bus will terminate at the region 85 and pigtail connections will be provided at the region 85 between longitudinally adjacent buses.

After the lower sections 12 are assembled on the supporting ring 20 and before the bus 10 is in place, the ring 90 is positioned at the longitudinal boundary between longitudinally adjacent housing sections 11 and 11a. Then after all of the assembly operations are completed, the top cover sections 13 are moved down into position on the lower housing sections 12 with the internal ring 90 being held so that it will be positioned as shown in Figures 1 and 5 when the closure of the housing is completed.

From the above, it will now be clear that the semicylindrical sections of the housings 11 and 12 may, if desired, be replaced by a continuous cylindrical housing.

As shown in Figures 1 and 3, the ring 90 is provided with dust-excluding gaskets 92, 92 positioned in appropriate grooves and a positioning annular extension 93 so that the ring 90 will be properly positioned with respect to the laterally adjacent housing sections 11 and 11a, and an insulating annular strip 94 may be provided at least at one side and preferably at both sides so that the laterally adjacent housing sections 11 and 11a are insulated from each other preventing the circulation of any currents throughout the bus housing.

In Figure 7 I have shown a support identical with that of Figure 2 (and which, therefore, has been given the same reference numbers). In Figure 7, the bus enclosure 111 is shown as a full cylindrical member rather than as two half members (12 and 13 of Figure 2). Where the full cylinder 111 is used, openings 54 therein receive the insulator threaded member 55 as pointed out in connection with Figure 2. These openings and the support members 20 are spaced sufficiently close to the ends of cylindrical housing 111 to enable the assembly operation to take place by the use of appropriate tools inserted from the open ends of the cylindrical housing 111.

In Figure 8 I have shown a modified construction wherein the support member 120 constitutes a half ring somewhat similar in construction and operation to that already described in connection with Figure 2.

The lower housing section 212 is carried and cradled by the ring 120. The upper housing section 213 of housing 211 is connected to the lower housing section by bolt 184 passing through flange 181 and flange 180 with the gasket 183 between substantially as previously described.

The shielding flange 182 is also provided for the purposes previously described. The flange 180, however, may be supported at the top surface 100 of the housing section 120 although this is not essential.

The insulator 156 carries at its inner end the half clamping ring 164 which corresponds to the clamping ring 64 of Figure 2 and is supported in the insulator 156 in substantially the same manner. Extension 155a of the mounting member 155 for the insulator is also received in the outer end of insulator 156 in the manner previously described.

The mounting member 155 is provided with the adjustable screw 155b in the opening 153 of the mounting member, the screw 155b carrying the support 155a at its end.

A lock nut 158 ensures that the longitudinal adjustment of the insulator 156 will be maintained. The mounting member 155 for the insulator 156 is secured to the top of each side of the support ring 120 by a pair of bolts 101, 101 passing through the openings 102, 102 at the top of each side of support member 120, the recess 103 being provided in the outer surface of the support member 120 on each side to receive the heads of the bolts 101.

Thus, the mounting member 155 is supported in off-set relation to the insulator 156. In order to obtain appropriate shielding between the upper end of the support member 120 and the mounting member 155, the insulator 156 may be provided with a downwardly directed extension 156a so that a possible strike-over between the bus and the mounting section will be prevented.

As shown in Figure 12, the insulator 256 may be provided having the greatly extended insulating annular leaf 256a which will serve to ensure an interruption of a possible strikeover path irrespective of the angular orientation of insulator 256.

The shading band 150 is provided for the same purpose as that previously described in connection with Figure 2. The bracket 120 may be supported on its structural base 115 by four bolts 127, two on each side passing through the ledge 105 on each side and being insulated from the bracket 120 by the insulating pad 130 and the insulating bushing 126.

In addition, an insulating pad 135 may be provided under each bracket between it and the supporting structure 115.

Figure 9:
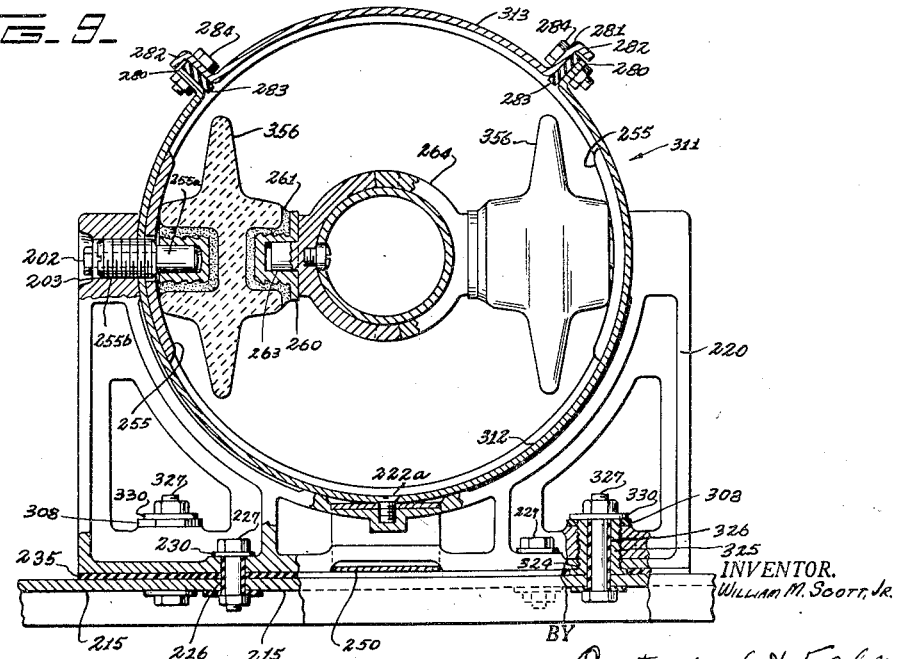
Figure 9 is a cross sectional view showing another modified form of bus support.

In Figure 9 I have shown a further modified form wherein the housing 311 consists of a lower section 312 and an upper section 313 connected by bolts 284 passing through flanges 281 and 280 and gasket 283 in the manner previously described.

In this modification I have shown the lower section 312 of the housing as occupying approximately 270° of the arc while the upper section 313 is correspondingly smaller.

Thus, the upper section 313 is essentially a removable cover for the housing while the lower section 312 is substantially the housing itself.

In this case, the support member 255 for insulator 356 is sufficiently wide that it may be secured to the upper section of support 220 by a pair of horizontally aligned bolts 202 passing through ledges 203 on each side of each vertical arm of the support or half ring 220.

The adjustable end 255a of the insulator is an extension of the adjusting screw 255b of the insulator which passes through an upper central opening of each arm of support ring 220 and a corresponding opening in the insulator support 255.

The manner of connection to insulator 356 and the manner of connection of insulator 356 to the clamping ring 264 is identical with that previously described. Also, bolts 227 may be provided corresponding exactly in function and operation to the bolts 127 of the modification of Figure 8.

In addition, if desired, or as a substitute for the bolts 227 in both the modifications of Figure 9 and of Figure 8, the bolt 327 may be provided having the insulating pad 330 under it and the insulating bushing 326 surrounding it. The insulating bushing and pad pass through the adjustable threaded member 326 in threaded opening 324 of the bracket 220. The threaded member 326 may be vertically adjusted and also the bolt 327 may be vertically adjusted by the adjusting nut 308.

The lower end of the bushing 325 may be insulated from the support structure in the manner already described in connection with Figure 2.

In Figures 10 and 11 I have shown cross-sections through the bracket arms of the structures of Figures 8 and 9 to indicate their preferred shape at that point.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a bus system, a support having a surface extending over an arc of substantially 180°, a pair of insulators on opposite sides of the bus to be supported, means for securing said insulators to said support, said insulators supporting said bus in spaced relation with said support and a housing for said bus carried by said support, said housing being mounted within said support surface and comprising two semi-cylindrical members; longitudinal flanges on each side of one of said semi-cylindrical members; a ledge on the upper portion of the support on each side; each longitudinal flange of said one semi-cylindrical member being positioned by said ledge.

2. In a bus system, a support having a surface extending over an arc of substantially 180°, a pair of insulators on opposite sides of the bus to be supported, means for securing said insulators to said support, said insulators supporting said bus in spaced relation with said support and a housing for said bus carried by said support, said housing being mounted within said support surface and comprising two semi-cylindrical members; longitudinal flanges on each side of one of said semi-cylindrical members; a ledge on the upper portion of the support on each side; each longitudinal flange of said one semi-cylindrical member being positioned by said ledge, longitudinal flanges on each side of the other semi-cylindrical member; each last-mentioned longitudinal flange registering with a first-mentioned longitudinal flange and being inter-engageable therewith to complete the housing.

References Cited in the file of this patent

UNITED STATES PATENTS

| | | |
|---|---|---|
| 2,144,247 | Scott | Jan. 17, 1939 |
| 2,335,543 | Rudd | Nov. 30, 1943 |
| 2,396,131 | Scott | Mar. 5, 1946 |
| 2,531,017 | West | Nov. 21, 1950 |
| 2,570,885 | Swerdlow | Oct. 9, 1951 |